Patented June 19, 1934

UNITED STATES PATENT OFFICE 1,963,862

PROCESS FOR RECOVERING CHEMICAL COMPOUNDS FROM THE GASES OF THE SODA MELTING FURNACES IN THE PRODUCTION OF SULPHATE CELLULOSE

Otto Nordström, Sundsvall, Sweden

No Drawing. Application March 16, 1932, Serial No. 599,356. In Sweden April 1, 1931

2 Claims. (Cl. 23—2)

The present invention relates to the recovery of chemical compounds from the gases of the soda melting furnaces in the production of sulphate cellulose, and has more specially for its object to permit recovery of the gaseous sulphur compounds of the gases, respectively, increasing of the sulphur content of the boiling liquor.

In the preparing of boiling liquor for the production of sulphate cellulose the lye previously used for boiling (black liquor), after having been concentrated to a black mass (black ash), is usually brought back to the soda melting furnaces, where a melting and a simultaneous burning of the organic materials of the black liquor takes place. Simultaneously, a suitable quantity of Glauber's salt is added to cover the losses of alkali and sulphur.

The gases escaping from the melting furnaces carry some fine solid particles, substantially sodium sulphate, but contain, in addition, also sulphur compounds in gaseous state. These gases are utilized, in the first place, to effect a final concentration of the black liquor, further, for the generation of steam, and, in some cases, also for drying and preheating of the wood slices, which are to be used for the production of the cellulose. In these operations it is substantially the heat content of the gases that are utilized and only in the said last-mentioned case the sulphur compounds of the gases are recovered to a certain extent. In order that the content of sulphur compounds in the boiling liquor shall not be too low, which would impair the quality of the pulp, it is, thus, necessary to add a larger quantity of sulphur compounds than would otherwise be necessary, if this source of losses did not exist.

In utilizing the gases from the soda melting furnaces as drying gases for the wood slices, as stated above, practically, all the solid particles contained in the gases may be recovered, provided the drying apparatus is so constructed as to cause a filtering of the gases to take place. Also a deal of the gaseous sulphur compounds is absorbed by the wood slices and recovered to be then supplied to the boiling liquor with said wood slices.

The present invention resides in an improvement in said method in order to enable a more complete recovery of the gaseous sulphur compounds of the gases from the soda melting furnaces, thereby correspondingly increasing the content of sulphur compounds of the boiling liquor.

According to the invention, the wood slices to be dried with the gases from the soda melting furnaces while effecting a simultaneous filtering of said gases are supplied with alkalies in any suitable form, in order that the gases shall have to pass a layer of wood slices, more or less completely impregnated or coated with alkalies. The gaseous sulphur compounds of the gases will then combine with the alkalies while forming solid compounds, which will remain on the surfaces of the slices or be absorbed thereby to be then supplied to the boiling liquor together with the slices, thereby increasing its content of sulphur compounds.

The alkaline substances, used for impregnating or coating the wood slices with alkali, may be added to the slices in form of alkaline solutions of different kinds. Thus, according to one form of the invention, the alkalies are added in the form of black liquor, the alkali content of which, if desired, may be increased by addition of further alkalies, for instance, soda, for the purpose of increasing its capacity of combining with, or absorbing, the gaseous sulphur compounds of the gases. The introduction of the black liquor into the layer of wood slices, or the coating of the slices with the black liquor may be performed in any suitable way, for instance, by sprinkling. The alkalies, instead of being supplied in form of solutions may also be added to the slices in solid state.

The supply of alkalies may also be carried out in such a way, that the alkalies while in dissolved or solid state are added to the gases from the soda melting furnaces, before their entrance in the layer of slices. The alkalies will then be retained by the slices together with the dust from the furnaces carried by the gases to then act as a binder or absorbent for the gaseous sulphur compounds.

It is to be noted that also other modifications of the method forming the subject matter of the invention may be possible without departing from the principle or scope of the invention.

What I claim is:—

1. A process for the recovery of gaseous sulphur compounds from the gases of the soda melting furnaces in the production of sulphate cellulose which consists in providing a mass of wood slices which are to be used for the production of sulphate cellulose, producing an alkali solution by adding soda to black liquor, impregnating said mass with said solution, and passing said gases through said impregnated mass.

2. A process for the recovery of gaseous sulphur compounds from the gases of the soda melting furnaces in the production of sulphate cellulose which consists in producing an alkali solution by adding soda to black liquor, supplying said solution to said gases, providing a mass of wood slices, which are to be used for the production of the cellulose, and passing said gases with supplied alkali solution through said mass.

OTTO NORDSTRÖM.